E. P. ALLEN, DEC'D.
M. A. ALLEN, EXECUTRIX.
AIR VALVE.
APPLICATION FILED MAR. 15, 1906.

1,110,095.

Patented Sept. 8, 1914.

Witnesses,
Edward T. Wray.
Percival H. Truman

Inventor.
Everett P. Allen
by Parker & Carter
Attorneys.

UNITED STATES PATENT OFFICE.

EVERETT P. ALLEN, OF CHICAGO, ILLINOIS; MARY A. ALLEN, EXECUTRIX OF SAID EVERETT P. ALLEN, DECEASED, ASSIGNOR TO DOLE VALVE COMPANY, OF CHICAGO, ILLINOIS, A CORPORATION OF ILLINOIS.

AIR-VALVE.

1,110,095.  Specification of Letters Patent.  Patented Sept. 8, 1914.

Application filed March 15, 1906. Serial No. 306,120.

*To all whom it may concern:*

Be it known that I, EVERETT P. ALLEN, a citizen of the United States, residing at Chicago, in the county of Cook and State of Illinois, have invented a certain new and useful Improvement in Air-Valves, of which the following is a specification.

My invention relates to air valves, and has for its object to provide a new and improved valve of this description.

Figure 1:
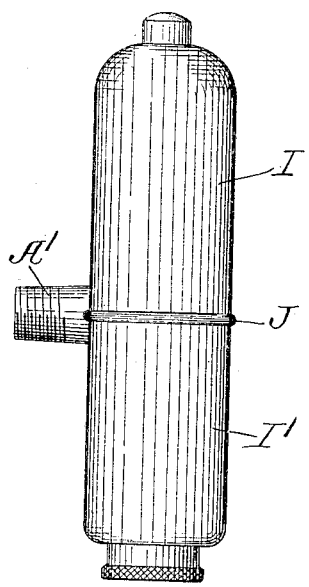
Figure 2:
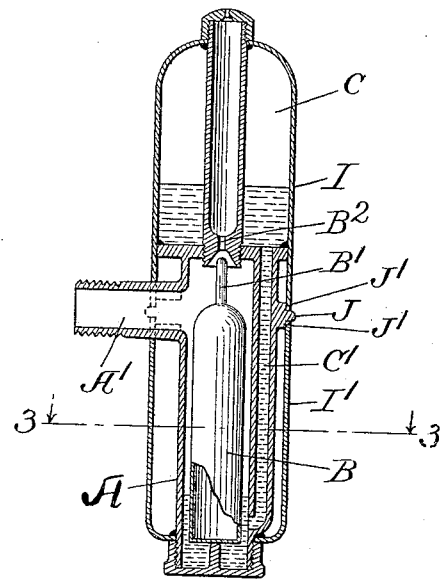
Figure 3:
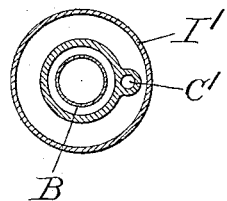

My invention is illustrated in the accompanying drawings, wherein—Figure 1 is a view in elevation of one form of valve embodying my invention; Fig. 2 is a sectional view of the valve shown in Fig. 1; Fig. 3 is a sectional view taken on line 3—3 of Fig. 2.

Like letters refer to like parts throughout the several figures.

The valve herein shown is adapted to be used in connection with steam heating devices, such as radiators, for the purpose of permitting the escape of the air. As herein shown, the valve is provided with the casing A provided with a projecting part $A^1$ by means of which the device is attached to the radiator. Within the casing A is a float B provided with an engaging part $B^1$ adapted when the float is in its operative position to close the passageway $B^2$ through which the air from the radiator escapes. The float B may be of any desired construction, and as herein shown consists of a hollow metallic float. An expansion chamber C is associated with the lower part of the casing and is located so that the heat of the air or steam or other material escaping through the passageway $B^2$ will act upon the fluid therein. The expansion chamber is preferably insulated from the radiator by an air space, or some other heat insulating material, so that it will not be heated by conduction from the radiator. This expansion chamber contains some suitable gas, such as air, and it is connected by a connection $C^1$ with the lower part of the valve casing containing the float B. The connection $C^1$, and under certain conditions at least a portion of the chamber C, contains a liquid such as water. The float B is moved to its operative position by this liquid. When the water reaches a suitable level in the casing A the float will be lifted so as to cause the engaging piece $B^1$ to close the passageway $B^2$, and when the level of this water is lowered a sufficient amount the float drops down and opens the passageway. When the radiator is not in operation the float is in a position where the passageway $B^2$ is open, as shown, for example, in Fig. 2. If, now, the steam is turned on the air in the radiator is driven out through the passageway $B^2$. When the steam begins to escape through said passageway the heat thereof acts upon the expansion chamber, expands the air or other fluid therein, and this forces the water into the casing A and causes the float B to rise so as to close the passageway and prevent the escape of steam. When the steam is shut off, the air in the expansion chamber C cools and hence contracts, thus producing a partial vacuum, and the water in the casing A is drawn up through the connection $C^1$ until the level in the casing A is lowered a sufficient amount to cause the float to drop and open the passageway.

It will be noted that since the expansion chamber is located so that it is only acted upon by the heat escaping through the passageway $B^2$, it only acts when there is heat escaping, and hence acts under the proper conditions and at the right time. Under ordinary conditions air is continually accumulating in the radiator, and this valve automatically permits this air to escape, for when the float B is raised so as to close the passageway $B^2$ it stops the escape of heat and consequently the air in the expansion chamber cools and the water in the casing A is lowered so as to cause the passageway $B^2$ to be opened. Any accumulated air will therefore escape, but when the steam escapes the passageway is automatically closed.

It will thus be seen that this valve operates, as it were, intermittently, while the radiator is in action, and that this intermittent operation is automatic. It will also be seen that this valve insures the proper withdrawal of air from the radiator at all times, and prevents the escape of steam therefrom. When the chamber A becomes filled with water up to the part $A^1$ the surplus flows over into the radiator, and returns to the boiler.

A suitable exterior shell may be provided. As herein shown this shell is made up of two parts I and $I^1$. The valve casing is provided near its middle with a projecting part J having the shoulders $J^1$. The ends of the shell engage said shoulders and the part J. The shell may be held in place by being brazed or otherwise fastened to the parts it is used to cover. In the present instance the part I of the shell acts as the exterior casing of the pressure chamber.

I claim:

1. An air valve comprising a casing adapted to be connected with a radiator, a passageway leading therefrom through which the air and steam from the radiator escape, an expansion chamber mounted upon said casing at the end thereof so that the escaping air and steam come into contact therewith after passing through said casing, a float in said casing adapted to control said passageway, a connection between said expansion chamber and said casing through which liquid may be moved from one to the other as the fluid in said expansion chamber expands and contracts.

2. An air valve comprising a casing adapted to be connected with a radiator, a passageway leading from said casing through which the air and steam from the radiator pass, a float within said casing controlling said passageway, an expansion chamber acted upon by the heat from the air or steam passing through said passageway and adapted to control the position of said float, said float shutting off the air or steam from the expansion chamber when in its operative position.

3. An air valve, comprising a float chamber, and an air chamber in communication therewith below the line of flotation thereof, said float chamber being provided with an inlet adapted to be placed in communication with a radiator and with an outlet passageway, a float, and a valve carried thereby for governing the inlet to said passageway, said passageway being so arranged with respect to said air chamber that the medium in the passageway may affect the thermal condition of the contents of the air chamber.

4. An air valve comprising a casing having an admission opening, a float located in said casing, said casing provided with a passage way through which air or steam may escape from the casing, said float adapted when in one position to close the entrance to said passage way, a controlling device for said float provided with a part surrounding said passage way, said part arranged to be acted upon by heat after it escapes past the entrance of said passage way controlled by said float.

5. An air valve comprising a casing having a passageway through which air or steam may escape a float therein controlling said passageway, said float adapted when in one position to close said passageway said passageway located above the float, an air chamber above the float arranged so that heat which escapes through the passageway will heat said air chamber, and a communication between said air chamber and the casing containing the float, and extending below the line of flotation of said float.

EVERETT P. ALLEN.

Witnesses:
PERCIVAL H. TRUMAN,
LUCY A. FALKENBERG.